US009159519B2

(12) United States Patent
Inoue et al.

(10) Patent No.: US 9,159,519 B2
(45) Date of Patent: Oct. 13, 2015

(54) PASTE FOR ELECTRON EMISSION SOURCE, AND ELECTRON EMISSION SOURCE

(75) Inventors: Takejiro Inoue, Otsu (JP); Kazuki Shigeta, Otsu (JP); Kazuki Goto, Tokyo (JP); Sunkyu Park, Seoul (KR)

(73) Assignee: TORAY INDUSTRIES, INC., Tokyo (JP)

( * ) Notice: Subject to any disclaimer, the term of this patent is extended or adjusted under 35 U.S.C. 154(b) by 798 days.

(21) Appl. No.: 13/389,896

(22) PCT Filed: Aug. 3, 2010

(86) PCT No.: PCT/JP2010/063070
§ 371 (c)(1), (2), (4) Date: Feb. 29, 2012

(87) PCT Pub. No.: WO2011/018958
PCT Pub. Date: Feb. 17, 2011

(65) Prior Publication Data
US 2012/0177887 A1 Jul. 12, 2012

(30) Foreign Application Priority Data
Aug. 11, 2009 (JP) ................................ 2009-186324

(51) Int. Cl.
*B32B 3/00* (2006.01)
*B32B 9/00* (2006.01)
(Continued)

(52) U.S. Cl.
CPC ................. *H01J 9/025* (2013.01); *H01J 1/304* (2013.01); *H01J 2201/30469* (2013.01); *H01J 2329/0455* (2013.01); *Y10T 428/24479* (2015.01)

(58) Field of Classification Search
CPC . H01J 1/304; H01J 9/025; H01J 2201/30469; H01J 2329/0455; Y10T 428/24479
USPC .............. 428/156, 167, 172, 408; 313/346 R; 977/742, 939; 252/500, 502, 512, 252/518.1
See application file for complete search history.

(56) References Cited

U.S. PATENT DOCUMENTS

2002/0195919 A1 12/2002 Choi et al.
2003/0178927 A1* 9/2003 Han et al. .................. 313/346 R
2010/0096972 A1 4/2010 Shigeta et al.

FOREIGN PATENT DOCUMENTS

EP 2120250 A1 * 11/2009
JP 2001-043792 A 2/2001
(Continued)

OTHER PUBLICATIONS

Translation for JP 2007-115675; Shigeta et al.; published May 10, 2007.*
(Continued)

*Primary Examiner* — Catherine A Simone
(74) *Attorney, Agent, or Firm* — Birch, Stewart, Kolasch & Birch, LLP

(57) ABSTRACT

Disclosed are: a paste for an electron emission source, which enables omission of an activation process and is capable of emitting electrons at a low voltage, while exhibiting excellent adhesion to a cathode substrate; and an electron emission source which uses the paste for an electron emission source. Specifically disclosed is an electron emission source which is produced by subjecting a paste for an electron emission source containing the components (A)-(C) described below to a heat treatment. The electron emission source has cracks and carbon nanotubes project from the surfaces of the cracks. (A) carbon nanotubes (B) glass powder (C) at least one substance selected from the group consisting of metal salts, metal hydroxides, organic metal compounds, metal complexes, silane coupling agents and titanium coupling agents.

7 Claims, 3 Drawing Sheets

(51) Int. Cl.

| | |
|---|---|
| ***H01B 1/04*** | (2006.01) |
| ***H01B 1/02*** | (2006.01) |
| ***H01J 9/02*** | (2006.01) |
| ***H01J 1/304*** | (2006.01) |

(56) References Cited

FOREIGN PATENT DOCUMENTS

| | | | |
|---|---|---|---|
| JP | 2003-059389 | A | 2/2003 |
| JP | 2003-242898 | A | 8/2003 |
| JP | 2004-87304 | A | 3/2004 |
| JP | 2005-222847 | A | 8/2005 |
| JP | 2007-115675 | A | 5/2007 |
| JP | 2008-500933 | A | 1/2008 |
| JP | 2008-243789 | A | 10/2008 |
| WO | WO 2005/113432 | A1 | 12/2005 |

OTHER PUBLICATIONS

Extended European Search Report for corresponding Application No. 10808141.5 dated Dec. 9, 2013.

International Search Report for PCT/JP2010/063070 dated Aug. 31, 2010.

* cited by examiner

PASTE FOR ELECTRON EMISSION SOURCE, AND ELECTRON EMISSION SOURCE

BACKGROUND OF THE INVENTION (1) Field of the Invention

The present invention relates to a paste for electron emission sources and an electron emission source using the paste.

(2) Description of Related Art

A carbon nanotube has excellent physical and chemical durability and has a sharp-pointed tip shape and is therefore suitable to an electron emission material. This is why electron emission sources using a carbon nanotube are being researched and developed in the fields of displays and luminaries.

The structure configured to obtain emission in displays, luminaries and the like by an electron emission source using a carbon nanotube is as follows. First, a high electric field is applied by a gate electrode and the like to an electron emission source including a carbon nanotube formed on a cathode substrate in a vacuum-sealed container. Then, the electric field is concentrated at a sharp-pointed tip of the carbon nanotube. When the intensity of the electric field exceeds a fixed threshold value, electrons are emitted by a tunnel phenomenon. The electrons emitted in this manner collide with a fluorescent layer formed on an anode substrate to obtain emission.

Among methods of producing an electron emission source using a carbon nanotube, there is a method in which a carbon nanotube is made into paste, which is then applied to a cathode substrate. This method involves a step of forming a coating film of a carbon nanotube-containing paste on a cathode electrode by screen printing, a step of removing organic materials which are the cause of deteriorating the degree of vacuum by heat treatment, from the coating film of the carbon nanotube-containing paste, and a step of performing activation treatment such as the tape peeling method and laser radiation method to the heat-treated surface of an electron emission source. As the paste material of the carbon nanotube used in this method, carbon nanotube-containing pastes containing a glass powder (see, for example, Japanese Unexamined Patent Publication No. 2007-115675), a carbonate (see, for example, Japanese Unexamined Patent Publication No. 2003-242898) or a metal carbonate (see, for example, Japanese Published Patent Publication No. 2008-500933) are known.

In the meantime, the activation treatment among the above steps is carried out to expose a carbon nanotube from the electron emission surface by napping treatment or the like to obtain good electron emission characteristics. However, if the step of activation treatment can be omitted, this can largely contribute to further reduction in cost.

As a method used to obtain good electron emission characteristics without performing the napping treatment, an electron emission source is proposed which comprises an electron emission material including a carbon nanotube, a cathode electrode and gate electrode that impart an electric field to the electron emission material, and a porous member including continuous pores between the cathode electrode and gate electrode wherein the porous member contains electron emission material and the tip part of the electron emission material projects from a pore wall of the porous member (see, for example, Japanese Unexamined Patent Publication No. 2004-87304). This electron emission source is obtained by forming voids in a region where plastic particles exist, thereby forming a continuous hole in a process in which the plastic particles such as methyl polymethacrylate are mixed in a carbon nanotube-containing paste to remove organic materials from the carbon nanotube-containing paste coating film by heat treatment. Since a carbon nanotube projects from a pore wall, it is unnecessary to carry out activation treatment. In this method, it is easy to increase the exposure amount of the tip part of the electron emission material and to improve the uniformity of exposure, enabling electron emission characteristics to be uniformed.

SUMMARY OF THE INVENTION

The method described in Japanese Unexamined Patent Publication No. 2004-87304, however, has the problem that the project length of the electron emission material is short and the aspect ratio of the electron emission material is small and therefore, an electric field is scarcely concentrated at the tip of the electron emission material, resulting increase in the voltage required for electron emission. Moreover, a material having a high resistance is used as the matrix of the porous member and a gate electrode is formed on the electron emission source, arousing a fear as to increase in leak current.

Attention is focused on the above problem in the present invention, and it is an object of the present invention to provide a paste for electron emission sources which can be produced by a process from which the activation treatment step of exposing a carbon nanotube from the surface of the electron emission source is omitted, enables electron emission at a low voltage and is superior in adhesion to the cathode substrate, and also to provide an electron emission source using the paste.

Accordingly, the present invention provides an electron emission source produced by heat-treating a paste for electron emission source containing the following components (A) to (C), the electron emission source having cracks, wherein a carbon nanotube projects from the surface of the cracks:

(A) a carbon nanotube;

(B) a glass powder; and (C) at least one substance selected from the group consisting of a metal salt, a metal hydroxide, an organic metal compound, a metal complex, a silane coupling agent and a titanium coupling agent.

According to the present invention, the activation treatment step of exposing a carbon nanotube from the surface of the electron emission source can be omitted, and therefore, the costs of the equipment and material necessary to the activation treatment step in the production of the electron emission source can be reduced. Also, according to the present invention, an electron emission source can be obtained which enables emission of electrons at a low voltage though it is unnecessary to perform the activation treatment and is superior in adhesion to the cathode substrate.

DETAILED DESCRIPTION OF PREFERRED EMBODIMENTS

Figure 1:
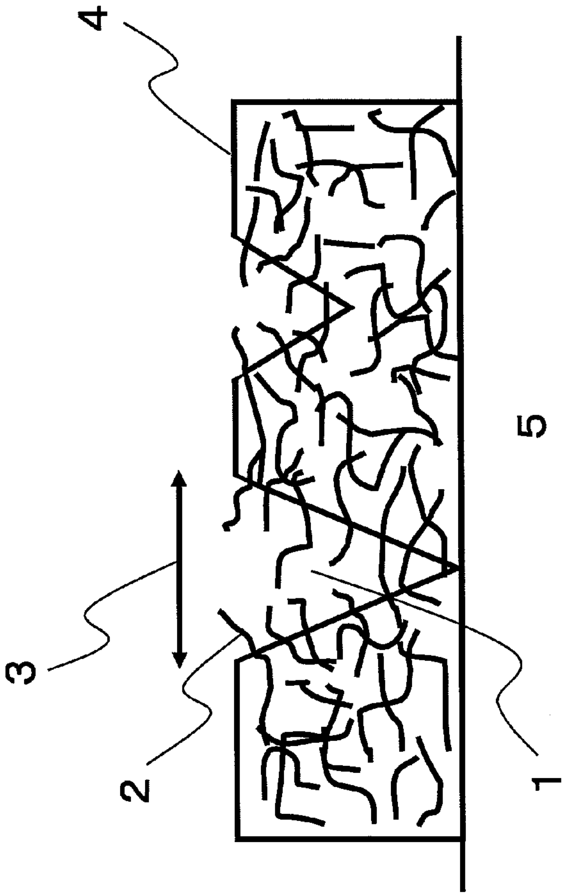
FIG. 1 is a sectional schematic diagram of an electron emission source according to the present invention.

The present invention relates to a paste for electron emission sources comprising a carbon nanotube, a glass powder, and one or two or more substances selected from the group consisting of a metal salt, metal hydroxide, organic metal compound, metal complex, silane coupling agent and titanium coupling agent, and to an electron emission source obtained using the paste. In other worlds, the electron emission source of the present invention is one produced by heat-treating a paste for electron emission sources which contains the following components (A) to (C), the electron emission source having cracks, wherein the carbon nanotube projects from the surface of the cracks:

(A) a carbon nanotube;

(B) a glass powder; and (C) at least one substance selected from the group consisting of a metal salt, metal hydroxide, organic metal compound, metal complex, silane coupling agent and titanium coupling agent.

When the above paste for electron emission sources is used, an electron emission source can be obtained which can emit electrons at a low voltage and is superior in the adhesion to the cathode substrate without performing activation treatment such as the tape peeling method and laser radiation method.

The reason why electrons can be emitted at a low voltage without performing activation treatment is inferred as follows. The electron emission source of the present invention is obtained by applying the above paste for electron emission sources to a substrate and heat-treating the applied paste. Here, when the electron emission source of the present invention is observed, it is found that the electron emission source generates a crack and the carbon nanotube projects from the crack in the heat-treating step. It is therefore considered that electron emission from the carbon nanotube projecting from the crack is available without performing activation treatment. Also, because the force works which draws out the carbon nanotube in an almost vertical direction with the section (surface of crack) generated by the crack inside of the electron emission source, the project length of the carbon nanotube is increased, leading to a large aspect ratio. As a result, an electric field tends to concentrate on the carbon nanotube and therefore, the voltage required for electron emission can be kept low. In order to emit electrons at a low voltage, the project length of the carbon nanotube from the surface of crack is preferably 0.5 μm or more. The voltage required for electron emission can be kept lower with increase in the project length of the carbon nanotube if the project length of the carbon nanotube is within the range in which short circuits are not caused by the contact between the projected nanotube and the gate electrode or anode electrode. Though there are the case where projected carbon nanotubes are crosslinked between cracks, these carbon nanotubes may be contained.

On the other hand, in the case of allowing a carbon nanotube to project from the pore wall of a continuous hole formed by plastic particles as described in the above Japanese Unexamined Patent Publication No. 2004-87304, the project length of the carbon nanotube is short, leading to a small aspect ratio, because the force drawing the carbon nanotube does not work. As a result, an electric field is scarcely concentrated on the tip of the carbon nanotube, with the result that the voltage required for electron emission is increased.

A metal salt, metal hydroxide, organic metal compound, metal complex, silane coupling agent and titanium coupling agent are decomposed by heating. However, these compounds are characterized by the feature that they are different from the plastic particles which are described in the aforementioned Japanese Unexamined Patent Publication No. 2004-87304 and are quite eliminated by burning or decomposition, and finally remain as a metal oxide or silicon compound. In the following explanations of this description, substances selected from a metal salt, metal hydroxide, organic metal compound, metal complex, silane coupling agent and titanium coupling agent are generically called "residual compound". When the residual compound is contained in the paste for electron emission sources, this causes generation of cracks in the electron emission source, enabling the production of a carbon nanotube increased in project length.

The crack of the electron emission source in the present invention means a slit which is generated on the electron emission source as shown in FIG. 1 and has a width of 0.5 μm or more. In this case, the width of the crack is that of the slit measured on the surface part of the electron emission source as shown by the sign 3 in FIG. 1. As to the depth of the crack, the crack may either reach or not reach the cathode substrate.

Figure 2:
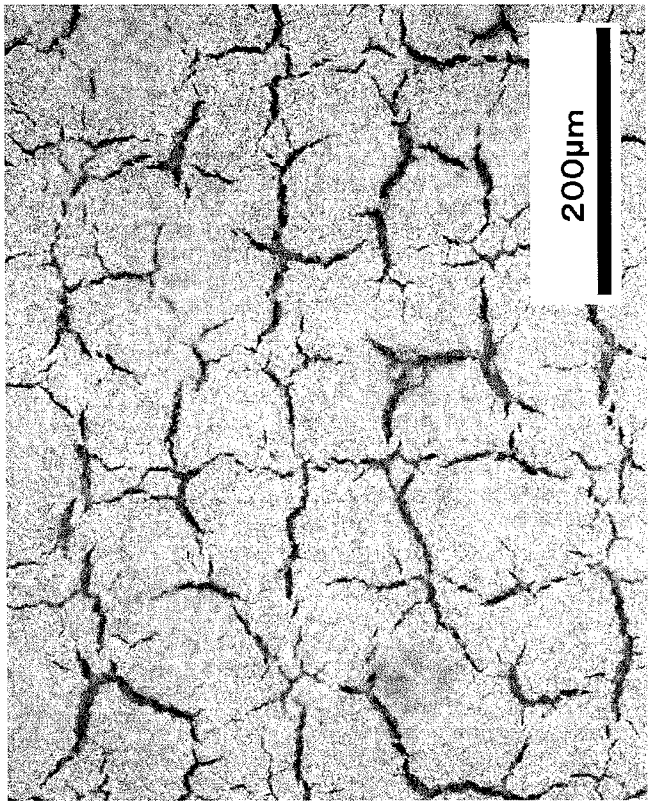
FIG. 2 is an optical electron micrograph of an electron emission source with generated cracks.
Figure 3:
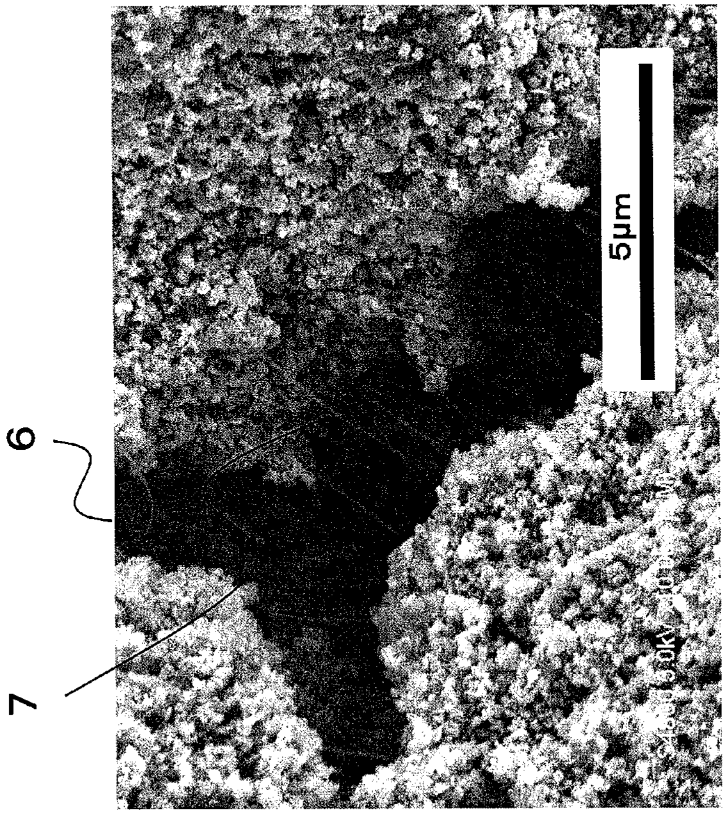
FIG. 3 is an electron micrograph of a carbon nanotube projecting from the surface of a crack generated on an electron emission source according to the present invention.

An optical micrograph of a crack on the surface of an electron emission source using basic magnesium carbonate as the residual compound is shown in FIG. 2 as an example. Also, an electron micrograph of a carbon nanotube projecting from the surface a crack is shown in FIG. 3.

The paste for electron emission sources and electron emission source according to the present invention will be explained in detail.

As the carbon nanotube as an electron emission material, any carbon nanotube among a single-, two-, or three- or more multi-wall carbon nanotube may be used. A mixture of carbon nanotubes differing in the number of walls may be allowed. Also, impurities such as amorphous carbon and catalyst metals may be refined away by heat treatment, acid treatment and the like. Because many carbon nanotubes exist as an aggregate made of entangled carbon nanotubes, a carbon nanotube powder may be milled in advance by a ball mill or beads mill.

The content of the carbon nanotube based on the total amount of the paste for electron emission sources is preferably 0.1 to 20% by weight, more preferably 0.1 to 10% by weight, and even more preferably 0.1 to 5% by weight. When the content of the carbon nanotube is within the above range, good electron emission characteristics, dispersibility, printability, and pattern-forming ability of the paste for electron emission sources are obtained.

Any glass powder may be used as the glass powder as long as it is softened in a step of removing organic materials from the carbon nanotube-containing paste by heat treatment and has the ability to bond the carbon nanotube with the cathode substrate. The softening point of the glass powder is preferably 500° C. or less and more preferably 450° C. or less taking it into account that the heat resistant temperature of the carbon nanotube is 500° C. to 600° C. and that an inexpensive soda lime glass (strain point: 500° C.) is used as the substrate. The use of the glass powder having the above softening point ensures that the carbon nanotube is restrained from burning down and an inexpensive substrate glass such as soda lime glass may be used. The glass powder is preferably leadless glass, and $Bi_2O_3$ based-glass, $SnO—P_2O_3$ based-glass, $SnO—B_2O_3$ based-glass, or alkali based-glass is particularly preferably used from the viewpoint of reduction of environmental load. When the above glass powder is used, the glass softening point can be controlled in a range from 300° C. to 450° C.

The content of the glass powder based on the paste for electron emission source is preferably 1 to 30% by weight. The lower limit of the content of the glass powder is more preferably 5% by weight and the upper limit of the content of the glass powder is more preferably 20% by weight. These preferable lower limits and upper limits can be combined optionally. When the amount of the glass powder is in the above range, good adhesion to the substrate or electrode can be obtained.

The average particle diameter of the glass powder is preferably 2 μm or less and more preferably 1 μm or less. When the average particle diameter of the glass powder is 2 μm or less, the ability to form a pattern of fine electron emission source and high adhesion between the electron emission source and the cathode electrode can be obtained.

Here, the average particle diameter means a 50% cumulative particle diameter ($D_{50}$). This indicates a particle diameter at a point of a percentage of 50% on a volume accumulation curve, when the volume accumulation curve is calculated letting the total volume of a population of one powder to be 100%. This is utilized as one of parameters for generally assessing grain size distribution as a cumulative median diameter. In this case, the size distribution of the glass powder can be measured by the micro-track method (method using a micro-track laser diffraction grain size distribution measuring device manufactured by NIKKISO CO., LTD.).

The metal salt indicates a metal carbonate, metal sulfate and metal nitrate and the like. As the metal carbonate, potassium carbonate, calcium carbonate, sodium carbonate, barium carbonate, magnesium carbonate, lithium carbonate, copper (II) carbonate, iron (II) carbonate, silver (I) carbonate, zinc carbonate, cobalt carbonate, nickel carbonate, and hydrotalcite may be used. Any of a hydrate (basic carbonate) or non-hydrate may be used.

Examples of the metal sulfate may include zinc sulfate, aluminum sulfate, potassium sulfate, calcium sulfate, silver sulfate, ammonium hydrogensulfate, potassium hydrogensulfate, thallium sulfate, iron (II) sulfate, Iron (III) sulfate, copper (I) sulfate, copper (II) sulfate, sodiumsulfate, nickel sulfate, barium sulfate, magnesium sulfate, and alums such as potassium alum and iron alum.

Examples of the metal nitrate may include zinc nitrate, aluminum nitrate, uranyl nitrate, chlorine nitrate, potassium nitrate, calcium nitrate, silver nitrate, guanidine nitrate, cobaltnitrate, cobalt(II)nitrate,cobalt(III)nitrate,cesium nitrate, ammonium ceriumnitrate, iron nitrate, iron (II) nitrate, iron (III) nitrate, copper (II) nitrate, sodium nitrate, lead (II) nitrate, barium nitrate and rubidium nitrate.

Examples of the metal hydroxide may include calcium hydroxide, magnesium hydroxide, manganese hydroxide, iron (II) hydroxide, zinc hydroxide, copper (II) hydroxide, lanthanum hydroxide, aluminum hydroxide and iron (III) hydroxide.

Examples of the organic metal compound may include compounds having a metal-carbon bond. Examples of the metal constituting the organic metal compound include tin (Sn), indium (In), antimony (Sb), zinc (Zn) gold (Au), silver (Ag), copper (Cu), palladium (Pd), aluminum (Al), titanium. (Ti), nickel (Ni), platinum (Pt), manganese (Mn), iron (Fe), cobalt (Co), chromium (Cr) and zirconium (Zn). Examples of the group contained in the organic chain which is combined with a metal element to form an organic metal compound include an acetyl group, alkyl group, alkoxy group, amino group, amide group, ester group, ether group, epoxy group, phenyl group and halogen group. Specific examples of the above organic metal compound include trimethyl indium, triethyl indium, tributoxy indium, trimethoxy indium, triethoxy indium, tetramethyltin, tetraethyltin, tetrabutyltin, tetramethoxytin, tetraethoxytin, tetrabutoxytin, tetraphenyltin, triphenylantimony, triphenylantimony diacetate, triphenylantimony oxide and triphenylantimony halide.

Examples of the metal complex include compounds having a structure in which a ligand is coordinated around a center metal element given as the examples of the organic metal compound. Examples of the ligand forming the metal complex include ligands having a lone pair such as an amino group, phosphino group, carboxyl group, carbonyl group, thiol group, hydroxyl group, ether group, ester group, amide group, cyano group, halogen group, thiocyano group, pyridyl group and phenanthryl group. Specific examples of the above ligand include triphenylphosphine, nitric acid ion, halide ion, hydroxide ion, cyanide ion, thiocyan ion, ammonia, carbon monoxide, acetyl acetonate, pyridine, ethylenediamine, bipyridine, phenanthroline, BINAP, cathecolate, terpyridine, ethylenediaminetetraacetic acid, porphyrin, cyclam, and crown ethers. Specific examples of the metal complex include an indium acetylacetonate complex, indium ethylenediamine complex, indium ethylenediamine tetraacetic acid, tin acetylacetonate complex, tin ethylenediamine complex and tin ethylenediamine tetraacetic acid.

Examples of the silane coupling agent include those having a hydrolyzable silyl group such as an alkoxy group, halogen and acetoxy group. Generally, alkoxy groups, particularly, a methoxy group and ethoxy group are preferably used. Examples of the organic functional group which the silane coupling has may include an amino group, methacryl group, acryl group, vinyl group, epoxy group, mercapto group, alkyl group and allyl group. Specific examples of the silane coupling agent may include N-β(aminoethyl)γ-aminopropyltrimethoxysilane, N-β(aminoethyl)γ-aminopropylmethyldimethoxysilane, N-phenyl-γ-aminopropyltrimethoxysilane, γ-aminopropyltrimethoxysilane, γ-dibutylaminopropyltrimethoxysilane, γ-ureidopropyltriethoxysilane, N-β-(N-vinylbenzylaminomethyl)-γ-aminopropyltrimethoxysilane hydrochloride, γ-methacryloxypropyltrimethoxysilane, γ-methacryloxypropyltriethoxysilane, γ-methacryloxypropylmethyldimethoxysilane, vinyltrimethoxysilane, vinyltriethoxysilane, vinyltriacetoxysilane, vinyltrichlorosilane, vinyltris(β-methoxyethoxy)silane, γ-glycidoxypropyltrimethoxysilane, γ-glycidoxypropylmethyldiethoxysilane, β-(3,4-epoxycyclohexyl)ethyltrimethoxysilane, γ-mercaptopropyltrimethoxysilane, γ-chloropropyltrimethoxysilane, methyltrimethoxysilane, methyltriethoxysilane, dimethyldimethoxysilane, dimethyldiethoxysilane, n-propyltrimethoxysilane, isobutyltrimethoxysilane, n-hexyltrimethoxysilane, n-decyltrimethoxysilane, n-hexadecyltrimethoxysilane, phenyltrimethoxysilane and diphenyldimethoxysilane. In the present invention, one substance selected from these coupling agents may be singly used or two or more types selected from these coupling agents may be combined and used. Also, either a self-condensate using one of the above coupling agents or a hetero-condensates obtained by combining two or more of the above coupling agents may be used.

Examples of the titanium coupling agent may include those obtained by replacing the silane part of a silane coupling agent with titanium.

In order to obtain the electron emission source of the present invention, it is important to generate cracks on the electron emission source by applying the paste for electron emission sources to a substrate and performing heat treatment. It is inferred that, at this time, the residual compound is heat-decomposed in the heat treatment with reduction in weight, which is a cause of the generation of cracks. It is also inferred that there is a large difference in the coefficient of thermal expansion between the residual compound and the glass powder, which is a cause of the generation of cracks.

The content of the residual compound based on the total weight of the paste for electron emission source is preferably 1 to 50% by weight. The lower limit of the content is more preferably 5% by weight, even more preferably 10% by weight and even more preferably 20% by weight. The upper limit of the content is more preferably 40% by weight and even more preferably 25% by weight. These preferable lower limits and upper limits can be combined optionally. When the content of the residual compound is in the above range, many cracks are formed in the electron emission source, so that good electron emission characteristics can be obtained.

The average particle diameter of the residual compound is preferably 0.1 to 50 μm. When the average particle diameter of the residual compound is in the above range, many cracks are formed in the electron emission source, and therefore, good electron emission characteristics can be obtained. In this case, the average particle diameter of the residual compound is a number average particle diameter calculated from the diameters of particles contained in a fixed range of visual field and measured by a scanning electron microscope. When the particle has an indefinite form, the maximum length of a line crossing the center of a particle is defined as the diameter of the particle. The above visual field may be determined corresponding to a particle size. For example, the visual field is 200 μm×100 μm when the average particle diameter is 10 μm or more and less than 100 μm, 40 μm×20 μm when the average particle diameter is 5 μm or more and less than 10 μm, 10 μm×5 μm when the average particle diameter is 1 μm or more and less than 5 μm, and 2 μm×1 μm when the average particle diameter is less than 1 μm.

As to the organic metal compound and metal complex, there is the case where their heat-decomposed products which are generated in heat-treating steps, such as a step for removing a binder and a firing step are deposited tar-wise in a furnace. It is therefore preferable to use at least one type of metal salts and metal hydroxides, such as water, Cox, NOx and SOx, generating heat-decomposed products which are not deposited tar-wise in a furnace. Moreover, it is more preferable to use at least one type among metal carbonates and metal hydroxides which generate water or Cox which scarcely damages a furnace.

Also, among the residual compounds, inorganic compounds such as metal salts and metal hydroxides which do not generate organic residues after heat-treating steps are preferably used. Particularly, metal salts such as metal carbonates, metal nitrates and metal sulfates can generate many cracks in the electron emission source because they each have a large shrinkage factor when they are heat-decomposed, and are desirable. Because the electron emission source having many cracks have many CNTs projecting from cracks, it has a long life and exhibits good electron emission characteristics. A metal carbonate among metal salts exhibits particularly excellent life characteristics and are therefore preferable. This reason is considered to be that the gas generating when the metal carbonate is decomposed is CO, $CO_2$ or $H_2O$ having no adverse influence on the electron emission source. As the metal of the metal salt, alkali metals and alkali earth metals such as Na, Mg and Ca are preferable in the point that good electron emission characteristics can be obtained because the work function of metal oxides left after the heat decomposition is low.

As particularly preferable form of the paste for electron emission sources, as mentioned above, a paste for electron emission sources containing a carbon nanotube, a glass powder and a metal carbonate is given as an example. Then, an electron emission source is obtained which contains a carbon nanotube, a glass component and a metal oxide and has cracks wherein the carbon nanotube is projected from the surface of the crack.

The paste for electron emission sources according to the present invention may contain conductive particles besides the above carbon nanotube, glass powder and residual compound. When the paste for electron emission sources contains the conductive particles, the resistance inside of the electron emission source is dropped, enabling electron emission from the electron emission source at a lower voltage. The above conductive particles are preferably particles containing a conductive oxide or particles obtained by coating a part or all of the surface of an oxide with a conductive material though any material may be used as the conductive particles without any particular limitation insofar as it has conductivity. This is because a metal has high catalytic activity and there is therefore the case where it deteriorates the carbon nanotube when the temperature is made to be high by firing or electron emission. As the conductive oxide, indium tin oxide (ITO), tin oxide, zinc oxide, and the like are preferable. Also, materials obtained by coating a part or all of the surface of an oxide such as titanium oxide and silicon oxide with ITO, tin oxide, zinc oxide, gold, platinum, silver, copper, palladium, nickel, iron, cobalt or the like are desirable. In this case, conductive oxides such as ITO, tin oxide and zinc oxide are also preferable as the coating material for the conductive material.

When conductive particles are contained in the paste for electron emission source, the content of the conductive particles is preferably 0.1 to 100 parts by weight based on 1 part of the carbon nanotube. The lower limit of the content is more preferably 0.5 parts by weight and the upper limit of the content is more preferably 50 parts by weight. These preferable lower and upper limits may be optionally combined. When the content of the conductive particles is in the above range, it is particularly preferable because the electrical contact between the carbon nanotube and the cathode electrode is more improved.

The average particle diameter of the conductive particles is preferably 0.1 to 1 μm and more preferably 0.1 to 0.6 μm. When the average particle diameter of the conductive particles is in the above range, the uniformity of resistance in the electron emission source is improved and also, good surface flatness is obtained and therefore, uniform electron emission from the surface of the electron emission force can be obtained at a low voltage. The average particle diameter so-called here means a 50% cumulative particle diameter ($D_{50}$).

The paste for electron emission sources according to the present invention also preferably contains a binder and a solvent. The paste may further contain additive components such as a dispersant, photocurable monomer, ultraviolet absorber, polymerization inhibitor, sensitizing adjuvant, plasticizer, thickener, antioxidant, organic or inorganic anti-precipitation agent, and leveling agent.

Examples of the binder include cellulose resins (for example, ethyl cellulose, methyl cellulose, nitrocellulose, acetyl cellulose, cellulose propionate, hydroxypropyl cellulose, butyl cellulose, benzyl cellulose and denatured cellulose), acryl resins (polymers constituted of at least one monomer selected from monomers such as acrylic acid, methacrylic acid, methylacrylate, methylmethacrylate, ethylacrylate, ethylmethacrylate, propylacrylate, propylmethacrylate, isopropylacrylate, isopropylmethacrylate, n-butylacrylate, n-butylmethacrylate, tert-butylacrylate, tert-butylmethacrylate, 2-hydroxyethylacrylate, 2-hydroxyethylmethacrylate, 2-hydroxypropylacrylate, 2-hydroxypropylmethacrylate, benzylacrylate, benzylmethacrylate, phenoxyethylacrylate, phenoxyethylmethacrylate, isobornylacrylate, isobornylmethacrylate, glycidylmethacrylate, styrene, α-methylstyrene,3-methylstyrene,4-methylstyrene, acrylamide, methacrylamide, acrylonitrile, and methacrylonitrile), ethylene-vinyl acetate copolymer resins, polyvinylbutyrals, polyvinyl alcohols, propylene glycols, urethane resins, melamine resins, phenol resins, and alkyd resins.

As the solvent, those which dissolve organic components such as a binder resin are preferable. Examples of the solvent include polyhydric alcohols such as diols and triols represented by ethylene glycol and glycerin, compounds obtained by etherifying and/or esterifying alcohols (ethylene glycol monoalkyl ether, ethylene glycol dialkyl ether, ethylene glycol alkyl ether acetate, diethylene glycol monoalkyl ether acetate, diethylene glycol dialkyl ether, propylene glycol monoalkyl ether, propylene glycoldialkyl ether, and propyleneglycolalkyl ether acetate). More specifically, terpineol, ethylene glycol monomethyl ether, ethylene glycol monoethyl ether, ethylene glycol monopropyl ether, ethylene glycol monobutyl ether, diethylene glycol dimethyl ether, diethylene glycol diethyl ether, ethylene glycol dipropyl ether, diethylene glycol dibutyl ether, methyl cellosolve acetate, ethyl cellosolve acetate, propyl cellosolve acetate, butyl cellosolve acetate, propylene glycol monomethyl ether acetate, propylene glycol monoethyl ether acetate, propylene glycol monopropyl ether acetate, 2,2,4-trimethyl-1,3-pentanediol monoisobutylate, and butylcarbitol acetate, or organic solvent mixtures containing one or more of the above solvents are used.

The paste for electron emission sources according to the present invention may be produced by formulating various components so as to obtain a predetermined composition and then uniformly mixing and dispersing these components by a kneader such as a three-roll mill, ball mill or beads mill. The viscosity of the paste is preferably in a range from 2 to 200 Pa·s though it is properly adjusted according to the proportions of additives such as a glass powder, thickener, organic solvent, plasticizer and anti-precipitation agent. When the paste is applied by the spin coating method, spraying method or ink jet method except for the slit die-coating method or screen printing method on the other hand, the viscosity of the paste is preferably 0.001 to 5 Pa·s.

The following explanations are furnished as to a method for producing an electron emission source by using the paste for electron emission sources according to the present invention. However, the electron emission source and electron emission device may be manufactured by other known methods and the manufacturing method is not limited to the manufacturing methods described below.

First, the method for manufacturing the electron emission source will be explained. The electron emission source is obtained by forming a pattern made of the paste for electron emission sources according to the present invention, followed by firing (heat treatment) as explained below.

First, a pattern of an electron emission source is formed on a substrate by using the paste for electron emission sources according to the present invention. As the substrate, any substrate maybe used insofar as it is used to fix the electron emission source, and examples of the substrate include a glass substrate, ceramic substrate, metal substrate and film substrate. It is preferable to form a conductive film on a substrate.

As a method for forming a pattern of the electron emission source on a substrate, the usual printing method such as the screen printing method or ink jet method is preferably used. When the paste for electron emission sources to which light sensitivity is imparted is used, this is preferable because a fine pattern of an electron emission source can be formed at one operation by photolithography. Specifically, the paste for electron emission sources to which light sensitivity is imparted is printed on a substrate by, for example, the screen printing method or using a slit die coater, followed by drying using a hot air dryer to obtain a coating film of the paste for electron emission sources. A pattern of an electron emission source can be formed by irradiating this coating film with ultraviolet light from the upper surface (electron emission source paste side) via a photomask and then, developing this coating film by, for example, an alkali developing solution or organic developing solution.

Next, the electron emission source pattern is fired (heat-treated). As to the firing atmosphere, the coating film of the paste is fired at a firing temperature of 400 to 500° C. in the air or in an atmosphere of inert gas such as nitrogen. The electron emission source is thus obtained.

Next, a method for manufacturing an electron emission device will be explained. The electron emission device can be obtained by forming an electron emission source made of the paste for electron emission sources according to the present invention on a cathode electrode to manufacture a rear plate, which is made to face a front plate provided with an anode electrode and a fluorescent body. A method for manufacturing a diode type electron emission device and a method for manufacturing a triode type electron emission device will be explained in detail.

In the method for manufacturing a diode type electron emission device, first, a cathode electrode is formed on a glass substrate. The cathode electrode is formed by forming a conductive film made of ITO or chromium on a glass substrate by the sputtering method or the like. Then, an electron emission source is manufactured using the paste for electron emission sources on the cathode electrode according to the above method to obtain a rear plate for a diode type electron emission device.

Next, an anode electrode is formed on a glass substrate. The anode electrode is formed by forming a transparent conductive film made of ITO on a glass substrate by the sputtering method. A fluorescent body is printed on the anode electrode to obtain a front plate of the diode type electron emission device.

The rear plate and front plate for the diode type electron emission device are applied to each other in such a manner that the electron emission source faces the fluorescent body with a spacer being interposed therebetween, and the space formed between both plates is evacuated through an exhaust pipe connected to a container to fuse the both in the situation where the degree of vacuum of the inside is $1\times10^{-3}$ Pa or less to thereby obtain a diode type electron emission device. In order to confirm the condition of electron emission, a voltage of 1 to 5 kV is supplied to the anode electrode to emit electrons from the carbon nanotube and the emitted electrons collide with the fluorescent body, thereby enabling light emission from the fluorescent body.

In the method for manufacturing a triode type electron emission device, first, a cathode electrode is formed on a glass substrate. The cathode electrode is formed by forming a conductive film made of ITO or chromium by the sputtering method or the like. Then, an insulation layer is manufactured on the cathode electrode. The insulation layer is manufactured using an insulation material in a film thickness of about 3 to 20 μm by, for example, the printing method or vacuum deposition method. Then, a gate electrode layer is formed on the insulation layer. The gate electrode layer is obtained by forming a conductive film made of, for example, chromium by the vacuum deposition method or the like. Then, an emitter hole is formed on the insulation layer. In the method of manufacturing the emitter hole, a resist material is first formed on the gate electrode by the spin coater method, dried, irradiated with ultraviolet light through a photomask to transfer a pattern, and then developed by, for example, an alkali developing solution. An emitter hole can be formed in the insulation layer by etching the gate electrode and insulation layer from an opening formed by the developing. Then, an electron emission source is manufactured inside of the emitter hole by using the paste for electron emission sources according to the above method, to thereby obtain a rear plate for a triode type electron emission device.

Next, a front plate for the triode type electron emission device is manufactured. As this front plate, the same one as the above front plate for the diode type electron emission device maybe used. Also, the application of the rear plate and front plate of the triode type electron emission device may be carried out in the same manner as in the case of the diode type electron emission device. A triode type electron emission device is thus obtained.

EXAMPLES

The present invention will be explained in more detail by way of examples. However, these examples are not intended to be limiting of the present invention. The residual compound used in each example and each comparative example was procured from Wako Pure Chemical Industries Ltd. The raw materials, used for the paste for electron emission source, other than the residual compound, and the assessing methods in each example and each comparative example are as follows.

A. Raw Material Used for the Paste for Electron Emission Sources

Carbon nanotube: Multi-wall carbon nanotube (manufactured by Toray Co., Ltd.)

Glass powder: SnO—$P_2O_5$ based-glass "KF9079" (manufactured by ASAHI GLASS CO., LTD.) was used. The glass powder having a softening point of 340° C. and an average particle diameter of 0.2 μm was used.

Conductive particles: White conductive powder (using spherical titanium oxide as its core, which is coated with a $SnO_2$/Sb conductive layer), manufactured by Ishihara Sangyo Kaisha Ltd., ET-500W, specific surface area: 6.9 $m^2$/g, density: 4.6 g/$cm^3$, average particle diameter: 0.19 μm.

Binder: Poly(isobutylmethacrylate) fine powder, [h]=0.60 (manufactured by Wako Pure chemical Industries Ltd.).

Solvent: Terpineol (manufactured by Wako Pure chemical Industries Ltd.).

B. Preparation of a Paste for Electron Emission Sources

A paste for electron emission sources in each example and comparative example was manufactured in the following manner. 1 g of a carbon nanotube, 8 g of a glass powder (not added in Comparative Example 3), 6 g of conductive particles, 20 g of a binder, and 65 g of a solvent were weighed and put in a zirconia container having a volume of 500 ml, and 0.3 mmφ zirconia beads (trade name: Toreceram, manufactured by Toray Co., Ltd.) were added to the mixture to predisperse by a planetary ball mill (Planetary type Ball Mill P-5, manufactured by Fritsch Japan Co., Ltd.) at 100 rpm. The mixture from which the zirconia beads were removed was kneaded by a three-roller mill. Next, a residual compound as shown in Tables 1 to 5 was added (not added in Comparative Examples 1 and 2) in a predetermined concentration (explained later) to the mixture, which was further kneaded by a three-roller mill to prepare a paste for electron emission sources.

C. Milling of the Residual Compound

Basic magnesium carbonate which was a metal carbonate used in Examples 17 to 20 was milled to adjust its average particle diameter prior to use. In the milling, 20 g of basic magnesium carbonate and 80 g of a solvent were weighed and put in a zirconia container having a volume of 500 ml, and 0.3 mmφ zirconia beads (trade name: Toreceram, manufactured by Toray Co., Ltd.) were added to the mixture which was then predispersed by a planetary ball mill (Planetary type Ball Mill P-5, manufactured by Fritsch Japan Co., Ltd.). The milled mixture solution from which the zirconia beads were removed was dried to obtain basic magnesium carbonate having a predetermined average particle diameter. Using a scanning electron microscope (trade name: 54800, manufactured by HITACHI, LTD.), the average particle diameter was measured from an image. The average value was found by measuring the diameters of all particles measurable in a visual field of 200 μm×100 μm in Example 16, in a visual field of 40 μm×20 μm in Example 17, in a visual field of 10 μm×5 μm in Examples 18 and 19, and in a visual field of 2 μm×1 μm in Example 20, and dividing the sum of the diameters by the number of measured particles. When the particle has an indefinite form, the maximum length of a line crossing the center of a particle is defined as the diameter of the particle.

D. Production of an Electron Emission Source

The paste for electron emission sources was printed on a soda lime glass substrate with an ITO thin film formed thereon so as to form a 5 mm×5 mm square pattern by using a SUS 325 mesh screen plate. The printed paste was dried at 100° C. for 10 minutes and then, fired at 450° C. in the air.

E. Measurements of the Film Thickness and Difference Between the Maximum Height and Minimum Height of a Coating Film of the Paste for Electron Emission Sources Before Firing Using Surfcom 1400 (stylus profile measuring system) manufactured by TOKYO SEIMITSU CO., Ltd., the film thickness curve was formed by measuring the paste coating film over a length of 5 mm or more to calculate an average value as the film thickness. Also, the maximum height and the minimum height were measured to calculate a difference between the both as a difference in height.

F. Measurement of the Film Thickness of an Electron Emission Source

Using a laser microscope (trade name: VK-9510, manufactured by KEYENCE CORPORATION), the electron emission source obtained by firing the coating film of the paste for electron emission sources was observed by an object lens with a magnifying power of 20. The film thicknesses of the electron emission sources in the observed visual field were measured by a VK Analyzer 2.2.0.0 to obtain a film thickness curve and the average value calculated from the curve was defined as the film thickness.

G. Observation of the Surface of the Electron Emission Source

Whether or not cracks were present on the surface of the electron emission source was observed by using an optical microscope.

H. Observation of the Length of the Carbon Nanotube Projected from the Surface of a Crack Generated on the Electron Emission Source The projection length of the carbon nanotube was observed by a scanning electron microscope (trade name: 54800, manufactured by HITACHI, LTD.)

I. Measurement of the Intensity of an Electric Field when the Current Density Reaches 0.1 mA/$cm^2$ A substrate on which the electron emission source was formed and a substrate prepared by forming a 5-μm-thick fluorescent layer (P22) on a soda lime glass substrate with an ITO thin film formed thereon were made to face each other with a 100-μm-thick spacer being interposed therebetween in a vacuum chamber having a degree of vacuum of $5\times10^{-4}$ Pa., and voltage was applied at 10 V/sec by a voltage application device (trade name: voltage resistant/insulating resistance tester TOS9201, manufactured by KIKUSUI ELECTRONICS CORPORATION). The intensity of the electric field at which the current density reached 0.1 $mA/cm^2$ was calculated from the obtained current-voltage curve (maximum current value: 10 $mA/cm^2$).

J. Observation of Luminous Uniformity

The luminous condition of the fluorescent layer was visually observed simultaneously when the electric field intensity at which the current density reached 0.1 $mA/cm^2$ was measured. The case where light was emitted in almost all area (80% or more) of the 5 mm×5 mm square pattern was rated as o, the case where light was emitted in a part of the area (30% or more and less than 80%) of the square pattern was rated as Δ, and the case where light was not emitted at all or light was emitted in a small area (less than 30%) of the square pattern was rated as ×.

K. Measurement of Life

A rear substrate in which a 1 cm×1 cm square electron emission device was formed on an ITO substrate and a front substrate in which a 5-μm-thick fluorescent layer (P22) was formed on an ITO substrate were made to face each other with a 100-μm-thick spacer being interposed therebetween in a vacuum chamber having a degree of vacuum of $5\times10^{-4}$ Pa. The voltage at which the current value was 1 $mA/cm^2$ was applied by a voltage application device (trade name: voltage resistant/insulating resistance tester TOS9201, manufactured by KIKUSUI ELECTRONICS CORPORATION). This current value was set to the initial current value and a variation in current value with time when the voltage at this time was applied continuously was measured. The time taken until the current value was decreased from the initial current value to 0.5 $mA/cm^2$ was defined as the life.

Examples 1 to 15

Effect of the Residual Compound

In Examples 1 to 15, the residual compound was added in an amount of 9% by weight in the paste for electron emission sources. The residual compound was a metal carbonate in Examples 1 to 7, a metal hydroxide in Example 8, a metal nitrate in Example 9, a metal sulfate in Example 10, a metal complex in Examples 11 to 14 and a silane coupling agent in Example 15. In any case, cracks on the surface of the electron emission source and a carbon nanotube which was projected from the surface of the cracks and had a project length of 0.5 μm or more were observed, and also, electron emission could be observed though no activation treatment was performed.

Examples 16 to 20

Effect of the Particle Diameter of the Residual Compound

In Examples 16 to 20, basic magnesium carbonate which was a metal carbonate was added in an amount of 20% by weight in the paste for electron emission sources. In any case, cracks on the surface of the electron emission source and a carbon nanotube which was projected from the surface of the cracks and had a project length of 0.5 μm or more were observed, and also, electron emission could be observed though no activation treatment was performed. In Example 16, the difference in height was slightly larger than the film thickness, though the difference in height was not preferably larger than the film thickness.

Examples 21 to 27

Effect of the Concentration of the Residual Compound

In Examples 21 to 27, basic magnesium carbonate which was a metal carbonate was added in the amounts (% by weight) shown in Table 3 in the paste for electron emission sources. In any case, cracks on the surface of the electron emission source and a carbon nanotube which was projected from the surface of the cracks and had a project length of 0.5 μm or more were observed, and also, electron emission could be observed though no activation treatment was performed. Though Example 21 was slightly deteriorated in luminous uniformity, Examples 22 to 25 were improved in luminous uniformity. In Examples 26 and 27, the electron emission source was destroyed by an impact inferred to be arc discharge a few seconds after the electron emission was observed.

Examples 28 to 32

Effect of the Film Thickness of the Electron Emission Source

In Examples 28 to 32, basic magnesium carbonate which was a metal carbonate was added in the amount of 20% by weight in the paste for electron emission sources. In any case, cracks on the surface of the electron emission source and a carbon nanotube which was projected from the surface of the cracks and had a project length of 0.5 μm or more were observed, and also, electron emission could be observed though no activation treatment was performed. Such a tendency was observed that the electric field intensity at which the current density reached 0.1 $mA/cm^2$ was decreased with increase in the film thickness of the electron emission source.

Comparative Examples 1 to 3

In Comparative Example 1, a paste for electron emission sources to which no residual compound was added was used. In Comparative Example 2, a paste for electron emission sources to which not the residual compound but a polystyrene powder was added as an organic compound in an amount of 20% by weight therein was used. In Comparative Example 3, a paste for electron emission sources to which no glass powder was added and basic magnesium carbonate was added as a metal carbonate in an amount of 20% by weight therein was used.

In Comparative Example 1, electron emission was not obtained even if an electric field of 16 V/μm was applied. In Comparative Example 2, only a carbon nanotube was observed in which the project length of the carbon nanotube projected from the wall surface of a void formed by the removal of a polystyrene powder by firing was less than 0.1 μm, and the electric field at which the current density reached 0.1 $mA/cm^2$ was large though electron emission was obtained. In Comparative Example 3, the electron emission source was destroyed by an impact inferred to be arc discharge simultaneously when observable electron emission was obtained.

TABLE 1

| No | Residual compound | Before firing Film thickness (μm) | Before firing Difference in height (μm) | After firing Film thickness (μm) | Intensity of electric field when current density reaches 0.1 mA/cm2 (V/μm) | Luminous uniformity | Life (hour) |
|---|---|---|---|---|---|---|---|
| Example 1 | Basic magnesium carbonate, heavy | 16.3 | 15.6 | 12.4 | 6.1 | ○ | 76 |
| Example 2 | Basic zinc carbonate | 22.5 | 19.0 | 17.0 | 8.6 | ○ | 55 |
| Example 3 | Basic cobalt (II) carbonate | 22.5 | 7.0 | 17.6 | 6.8 | ○ | 52 |
| Example 4 | Basic copper (II) carbonate | 27.5 | 20.0 | 12.9 | 9.1 | ○ | 51 |
| Example 5 | Basic nickel carbonate | 22.5 | 11.5 | 15.6 | 7.0 | ○ | 53 |
| Example 6 | Sodium carbonate | 16.0 | 8.0 | 9.8 | 5.6 | ○ | 65 |
| Example 7 | Calcium carbonate | 21.0 | 16.0 | 13.3 | 4.8 | ○ | 71 |
| Example 8 | Magnesium hydroxide | 18.0 | 12.0 | 14.6 | 7.6 | ○ | 31 |
| Example 9 | Magnesium nitrate hexahydrate | 20.0 | 17.0 | 12.4 | 6.9 | ○ | 41 |
| Example 10 | Magnesium sulfate heptahydrate | 21.0 | 18.0 | 13.7 | 7.2 | ○ | 39 |
| Example 11 | Bis(acetylacetonato)nickel (II) hydrate | 18.0 | 15.0 | 7.6 | 7.3 | ○ | 16 |
| Example 12 | Bis(acetylacetonato)zinc (II) | 23.0 | 13.0 | 11.4 | 7.6 | ○ | 22 |
| Example 13 | Tris(acetylacetonato)indium (III) | 20.0 | 13.0 | 11.4 | 6.1 | ○ | 21 |
| Example 14 | Bis(acetylacetonato)copper (II) | 17.0 | 13.0 | 9.7 | 9.1 | ○ | 13 |
| Example 15 | Tetraethoxysilane | 16.0 | 2.5 | 10.5 | 11.0 | ○ | 20 |

TABLE 2

| No | Residual compound/ average particle diameter (μm) | Before firing Film thickness (μm) | Before firing Difference in height (μm) | After firing Film thickness (μm) | Intensity of electric field when current density reaches 0.1 mA/cm2 (V/μm) | Luminous uniformity |
|---|---|---|---|---|---|---|
| Example 16 | Basic magnesium carbonate, heavy 50 μm | 20.0 | 26.0 | 15.0 | 5.5 | ○ |
| Example 17 | Basic magnesium carbonate, heavy 8 μm (milled) | 21.0 | 18.0 | 14.8 | 6.0 | ○ |
| Example 18 | Basic magnesium carbonate, heavy 2 μm (milled) | 17.5 | 16.0 | 12.8 | 6.8 | ○ |
| Example 19 | Basic magnesium carbonate, heavy 1 μm (milled) | 17.5 | 13.0 | 13.6 | 7.0 | ○ |
| Example 20 | Basic magnesium carbonate, heavy 0.5 μm (milled) | 15.0 | 3.0 | 11.5 | 6.6 | ○ |

TABLE 3

| No | Residual compound/ concentration in a paste | Before firing Film thickness (μm) | Before firing Difference in height (μm) | After firing Film thickness (μm) | Intensity of electric field when current density reaches 0.1 mA/cm2 (V/μm) | Luminous uniformity |
|---|---|---|---|---|---|---|
| Example 21 | Basic magnesium carbonate, heavy/5 wt % | 13.4 | 1.5 | 10.5 | 7.5 | Δ |
| Example 22 | Basic magnesium carbonate, heavy/10 wt % | 11.6 | 3.1 | 9.6 | 7.0 | ○ |
| Example 23 | Basic magnesium carbonate, heavy/15 wt % | 10.6 | 3.7 | 9.2 | 6.4 | ○ |
| Example 24 | Basic magnesium carbonate, heavy/20 wt % | 12.3 | 6.1 | 10.7 | 6.3 | ◎ |
| Example 25 | Basic magnesium carbonate, heavy/25 wt % | 12.5 | 6.2 | 10.5 | 5.8 | ◎ |
| Example 26 | Basic magnesium carbonate, heavy/30 wt % | 13.3 | 6.9 | 10.2 | 5.2 | ○→X |
| Example 27 | Basic magnesium carbonate, heavy/40 wt % | 13.6 | 8.0 | 11.1 | 5.2 | ○→X |

TABLE 4

| No | Residual compound/ average particle diameter (μm) | Before firing Film thickness (μm) | Before firing Difference in height (μm) | After firing Film thickness (μm) | Intensity of electric field when current density reaches 0.1 mA/cm2 (V/μm) | Luminous uniformity |
|---|---|---|---|---|---|---|
| Example 28 | Basic magnesium carbonate, heavy/0.5 μm | 4.3 | 4.8 | 3.5 | 11.0 | Δ |

TABLE 4-continued

| No | Residual compound/ average particle diameter (μm) | Before firing Film thickness (μm) | Difference in height (μm) | After firing Film thickness (μm) | Intensity of electric field when current density reaches 0.1 mA/cm2 (V/μm) | Luminous uniformity |
|---|---|---|---|---|---|---|
| Example 29 | Basic magnesium carbonate, heavy/0.5 μm | 8.1 | 4.5 | 6.5 | 7.0 | ○ |
| Example 30 | Basic magnesium carbonate, heavy/0.5 μm | 12.3 | 6.1 | 9.2 | 6.3 | ○ |
| Example 31 | Basic magnesium carbonate, heavy/0.5 μm | 16.8 | 6.5 | 13.1 | 5.1 | ○ |
| Example 32 | Basic magnesium carbonate, heavy/0.5 μm | 21.2 | 6.6 | 16.0 | 4.1 | ○ |

TABLE 5

| No | Residual compound or organic material | Before firing Film Thickness (μm) | Difference in height (μm) | After firing Film thickness (μm) | Intensity of electric field when current density reaches 0.1 mA/cm2 (V/μm) | Luminous uniformity | Life (hour) |
|---|---|---|---|---|---|---|---|
| Comparative Example 1 | None | 14.8 | 2.3 | 10.0 | >16 | X | Unmeas-urable |
| Comparative Example 2 | Mega-beads NIST traceable particle diameter standard particles 10.0 (μm) | 14.0 | 11.0 | 9.2 | 15.1 | ○ | 2 |
| Comparative Example 3 | Basic magnesium carbonate, heavy | 23.2 | 28.0 | 21.0 | Unmea-surable | X | Unmea-surable |

Explanation of symbols 1 a crack generated on an electron emission source
2 projected carbon nanotube
3 the width of a crack
4 an electron emission source
5 a cathode substrate
6 a crack
7 projected carbon nanotube

What is claimed is:

1. An electron emission source produced by heat-treating a paste for electron emission sources containing the following components (A) to (C), the electron emission source having cracks, wherein a carbon nanotube projects from the surface of the cracks:

(A) a carbon nanotube;
(B) a glass powder; and
(C) a metal carbonate.

2. An electron emission device comprising the electron emission source as claimed in claim 1.

3. The electron emission source according to claim 1, wherein the emission source is produced by heat-treating at a firing temperature of 400 to 500° C.

4. A paste for electron emission sources, the paste comprising a carbon nanotube, a glass powder and a metal carbonate, wherein the content of the metal carbonate based on the total weight of the paste for electron emission source is 10 to 25% by weight.

5. A method for manufacturing an electron emission source having cracks, wherein a carbon nanotube projects from the surface of the cracks, the method comprising heat-treating the paste for electron emission sources as claimed in claim 4.

6. The method according to claim 5, the method omitting an activation treatment step of exposing a carbon nanotube from the surface of the electron emission source.

7. The method for manufacturing an electron emission source having cracks according to claim 5, wherein the heat-treating is at a firing temperature of 400 to 500° C.

* * * * *